(12) United States Patent
Tunstall

(10) Patent No.: US 11,844,459 B2
(45) Date of Patent: Dec. 19, 2023

(54) ALUMINUM POT WITH INCREASED THERMAL ABSORPTION

(71) Applicant: HIGH PERFORMANCE COOKERS LLC, Abita Springs, LA (US)

(72) Inventor: Todd Bard Tunstall, Madisonville, LA (US)

(73) Assignee: HIGH PERFORMANCE COOKERS LLC, Abita Springs, LA (US)

( * ) Notice: Subject to any disclaimer, the term of this patent is extended or adjusted under 35 U.S.C. 154(b) by 777 days.

(21) Appl. No.: 16/943,305

(22) Filed: Jul. 30, 2020

(65) Prior Publication Data
US 2022/0031115 A1   Feb. 3, 2022

(51) Int. Cl.
   *A47J 36/02*   (2006.01)
(52) U.S. Cl.
   CPC ..................... *A47J 36/02* (2013.01)
(58) Field of Classification Search
   CPC ......... A47J 27/002; A47J 27/022; A47J 36/02
   USPC .......................................................... 126/345
   See application file for complete search history.

(56) References Cited

U.S. PATENT DOCUMENTS

| | | | | |
|---|---|---|---|---|
| 2,569,112 A | * | 9/1951 | Miller | F24D 1/00 237/67 |
| 3,004,330 A | * | 10/1961 | Wilkins | B21C 37/14 D23/266 |
| 5,564,589 A | * | 10/1996 | Fu | A47J 27/02 220/573.1 |
| 6,044,839 A | * | 4/2000 | Furuhashi | A47J 37/1247 99/403 |
| 6,374,821 B1 | * | 4/2002 | Furuhashi | A47J 37/1247 165/185 |
| 2007/0193575 A1 | * | 8/2007 | Jan | A47J 27/002 126/390.1 |
| 2015/0136791 A1 | * | 5/2015 | Povey | A47J 27/02 220/573.1 |

* cited by examiner

*Primary Examiner* — Avinash A Savani
(74) *Attorney, Agent, or Firm* — Gregory Ozga; Warn Partners, P.C.

(57) ABSTRACT

A tunnel tube cooking pot that substantially improves thermal absorption of an aluminum boiling pot by welding specially designed and tuned pieces of aluminum channel or tubing on the bottom of the pot.

6 Claims, 1 Drawing Sheet

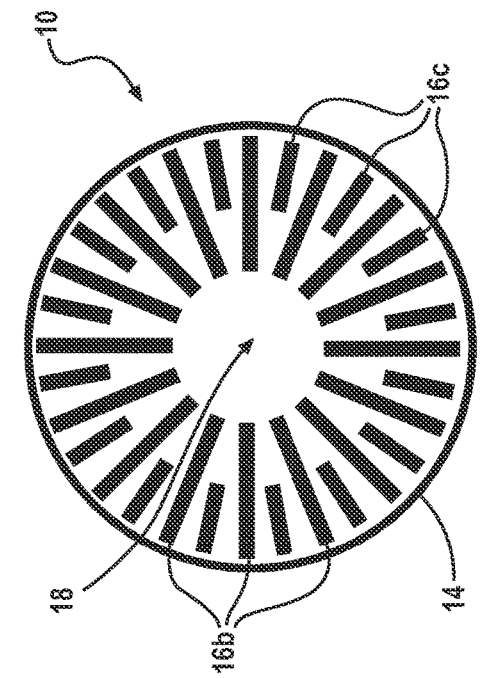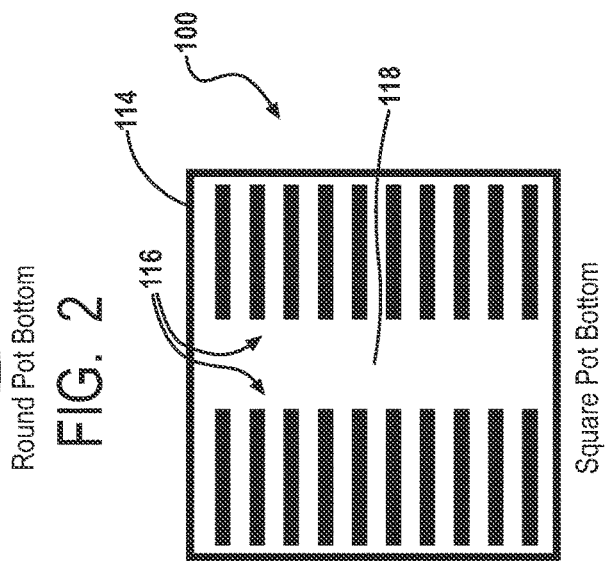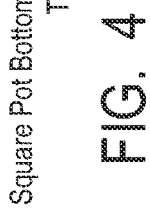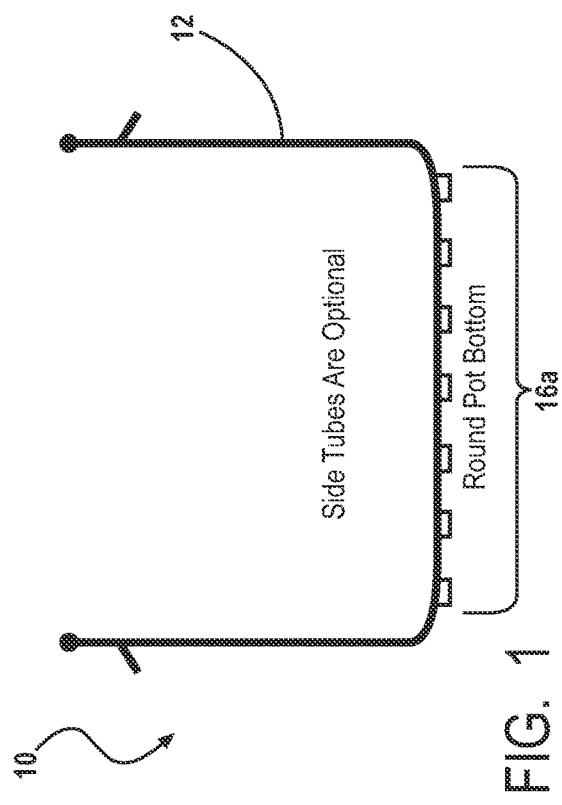

ALUMINUM POT WITH INCREASED THERMAL ABSORPTION

FIELD OF THE INVENTION

The present invention relates to an aluminum pot with increased thermal absorption of hot gases from a gas burner by an aluminum channel and aluminum tubing welded to the bottom and optionally the sides of an aluminum pot.

BACKGROUND OF THE INVENTION

Boiling seafood in a conventional aluminum pot on a gas burner takes a long time to come to a boil and burns more fuel due to the limited amount of surface area on the bottom of an average aluminum pot. For example, boiling 40 quarts of water in an 80-quart conventional pot take about 30 minutes. The Tunnel Tube 80-quart pot bottom design brings the same amount of water 40 quarts to a boil in just one third the time 10 minutes.

SUMMARY OF THE INVENTION

Our invention solves several problems associated with a conventional boiling pot. Not only do our tunnel tube pots come to a boil in one third the time but they also use only one third the amount of fuel as a conventional pot. Our pots are extremely energy efficient and cost far less to operate as well. Our pots also produce far more cooked food per hour and save time.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings.

FIG. 1 is a schematic side view of a tunnel tube cooking pot with extruded aluminum channels connected according to a first embodiment of the present invention.

FIG. 2 is a bottom plan view of the tunnel tube cooking pot according to the first embodiment of the present invention.

FIG. 3 is a schematic side view of a second embodiment of the tunnel tube cooking pot with extruded aluminum channels and an aluminum plate connected to the side.

FIG. 4 is a bottom plan view of the second embodiment.

DETAILED DESCRIPTION OF THE PREFERRED EMBODIMENTS

The following description of the preferred embodiments is merely exemplary in nature and is in no way intended to limit the invention, its application, or uses.

Referring now to FIGS. 1 and 2 a tunnel tube cooking pot 10 according to a first embodiment of the present invention is shown. In this particular embodiment the tunnel tube cooking pot 10 is a round pot 12 with a bottom surface 14 that is round or circular in shape and has a plurality of extruded aluminum channels 16a welded thereon in a specific pattern. As shown in FIG. 2 the extruded aluminum channels are arranged in a pattern extending outward away from a center 18 of the bottom surface 14. The extruded aluminum channels include long channels 16b and short channels 16c that are arranged in an alternating pattern on the bottom surface 14.

Referring now to FIGS. 3 and 4 a tunnel tube cooking pot 100 according to a second embodiment of the invention is shown. In this particular embodiment the tunnel tube cooking pot 100 is a square pot 112 with a bottom surface 114 that is generally square shaped and has a plurality of extruded aluminum channels 116 that are all the same length and extend away from a center 118 of the bottom surface 114. The tunnel tube cooking pot 100 according to this embodiment further includes optional extruded aluminum tubing 130a, 130b, 130c, 130d, 130e, 130f, 130g, also called side tubes, that are welded to the sides of the pot in a specific pattern. An aluminum plate 132 is welded over the extruded aluminum tubing 130a, 130b, 130c, 130d, 130e, 130f, 130g. The extruded aluminum tubing 130a, 130b, 130c, 130d, 130e, 130f, 130g and the aluminum plate 132 are optional and can also be added to the round pot 12 of the tunnel tube cooking pot 10.

The tunnel tube cooking pot 10, 100 according to the above embodiments of the invention have nearly four times the surface area of a traditional pot and come to a boil in about one third of amount of time as a traditional pot. The increased surface area is achieved by welding special size pieces of aluminum channel onto the bottom of the pot in a specific way. As hot gases from a burner come into contact with the bottom surface 14, 114 of the respective round pot 12 or square pot 112, the hot gases are forced to flow through the extruded aluminum channels 16a, 116. If present the hot gases flow also flow through the extruded aluminum tubing 130a, 130b, 130c, 130d, 130e, 130f, 130g and aluminum plate 132; thereby causing the hot gases to give up its thermal energy to the increased surface area on the channel walls both inner and outer.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A tunnel tube cooking pot comprising:
   an aluminum pot having a bottom surface and side surface;
   a plurality of extruded aluminum channels welded to the bottom surface of the aluminum pot thereby increasing a surface area on the bottom surface of the aluminum pot and providing greater energy absorption, and
   a plurality of side tubes welded to a side of the aluminum pot and an aluminum plate welded over and across a portion of the plurality of side tubes.

2. The tunnel tube cooking pot of claim 1 wherein the plurality of extruded aluminum channels include both long channels and short channels arranged in an alternating pattern on the bottom surface.

3. The tunnel tube cooking pot of claim 2 wherein the aluminum pot is a round pot with a round bottom surface.

4. The tunnel tube cooking pot of claim 2 wherein the extruded aluminum channels are arranged to extend outward and away from a center of the bottom surface.

5. The tunnel tube cooking pot of claim 1 wherein the aluminum pot has a square pot with a square bottom surface.

6. The tunnel tube cooking pot of claim 5 wherein the aluminum pot has a plurality of extruded aluminum channels that are all the same length and extend away from a center of the bottom surface.

\* \* \* \* \*